United States Patent [19]

Hirabayashi et al.

[11] 4,401,341

[45] Aug. 30, 1983

[54] PANEL REINFORCEMENT STRUCTURE CONSTRUCTION

[75] Inventors: Hirokazu Hirabayashi, Tokyo; Hirotaka Tomioka; Shuji Yamagata, both of Yokohama, all of Japan

[73] Assignee: Nissan Motor Co., Ltd., Yokohama, Japan

[21] Appl. No.: 242,278

[22] Filed: Mar. 10, 1981

[30] Foreign Application Priority Data

Mar. 17, 1980 [JP] Japan .................................. 55-32625

[51] Int. Cl.³ ............................................ B62D 25/02
[52] U.S. Cl. ................................... 296/185; 296/191; 296/195
[58] Field of Search ............... 296/187, 191, 193, 194, 296/195, 203, 204, 29, 30; 280/797, 798, 799, 800; 52/731, 733

[56] References Cited

U.S. PATENT DOCUMENTS 2,248,319 7/1941 Waterhouse, Jr. .................. 296/203

FOREIGN PATENT DOCUMENTS 1060864 3/1967 United Kingdom .

Primary Examiner—Robert R. Song
Assistant Examiner—Dennis Pedder
Attorney, Agent, or Firm—Thompson, Birch, Gauthier & Samuels

[57] ABSTRACT

A panel reinforcement structure construction for attaching to and reinforcing a vehicle structural panel. An elongate channel member has two side sections and is secured at the elongate open section thereof to the vehicle structural panel. An arm is attached to each channel member side section, and each arm extends from the end of the channel member transversely to the elongate axis of the channel member. An attachment flange is attached to each channel member arm in a manner to also attach to the vehicle structural panel to reinforce the structural integrity thereof and resist the effect of shear forces acting transversely on the elongate channel member.

3 Claims, 6 Drawing Figures

PANEL REINFORCEMENT STRUCTURE CONSTRUCTION

BACKGROUND OF THE INVENTION

1. Field of the Invention

The present invention relates to a panel reinforcement structure construction for attaching to and reinforcing a vehicle structural panel.

2. Description of the Prior Art

Referring to FIGS. 1 and 2, there is shown a conventional panel reinforcement structure construction for attaching to and reinforcing a vehicle structural panel of an automobile, wherein disposed near both sides of the lower surface of a rear floor panel 1 are elongate channel members 2, often referred to as rear side members, in the longitudinal direction of a vehicle body, with their open sections facing upwardly. Each of the elongate channel members 2 is provided with attachment flanges 4 extending outwardly from the upper edges of the two side sections 3, 3 thereof. The attachment flanges 4, 4 are attached to the rear floor panel 1 by spot welding. There are provided arms 5, 5 at the rear ends of both side sections 3, 3 of the elongate channel member 2. Each arm 5 extends outwardly from the end of each side section 3. These arms 5, 5 are attached by spot welding to a rear lower panel 6 which is welded to the rear edge of the rear floor panel 1 and to a rear upper panel 7 so as to reinforce the structural integrity and to resist the effect of shear forces F acting transversely on the elongate channel member 2.

With the panel reinforcement structure construction of this kind, since the arms 5, 5 on the rear ends of the side sections of the elongate channel member 2 are welded to the rear lower panel 6 so as to resist the effect of shear forces acting transversely on the elongate channel member 2, the rear lower panel 6 is an indispensable structural member, thus resulting in an increase in weight of the vehicle body. Thus, it does not meet the recent demand that the weight of the vehicle body be reduced.

SUMMARY OF THE INVENTION

According to the present invention, a panel reinforcement structure construction for attaching to and reinforcing a vehicle structural panel comprises: an elongate channel member secured at the elongate open section thereof to the vehicle structural panel, an arm attached to each side section of the channel member and extending from the end of the channel member transversely to the elongate axis of the channel member, and an attachment flange attached to each channel member arm in a manner to also attach to the vehicle structural panel to reinforce the structural integrity thereof and resist the effect of shear forces acting transversely on the elongate channel member.

Accordingly, an object of the present invention is to provide a panel reinforcement structure construction which has eliminated a rear lower panel.

DESCRIPTION OF THE EMBODIMENTS

Figure 1:
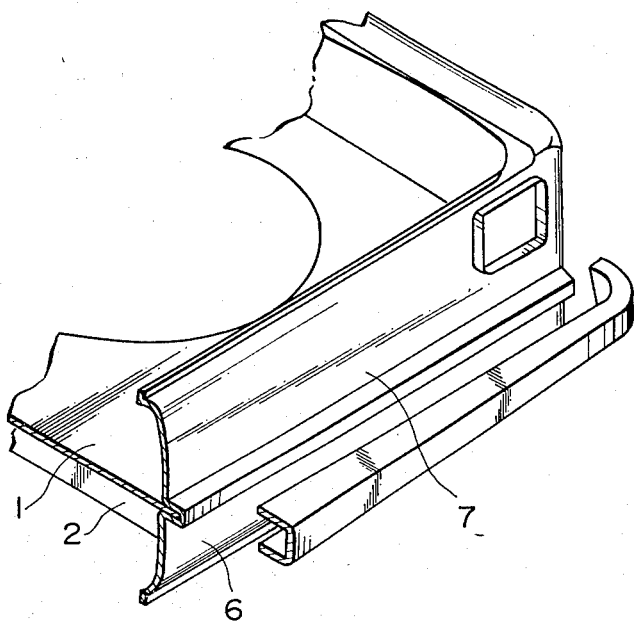
FIG. 1 is a perspective view showing a conventional panel reinforcement structure construction.
Figure 2:
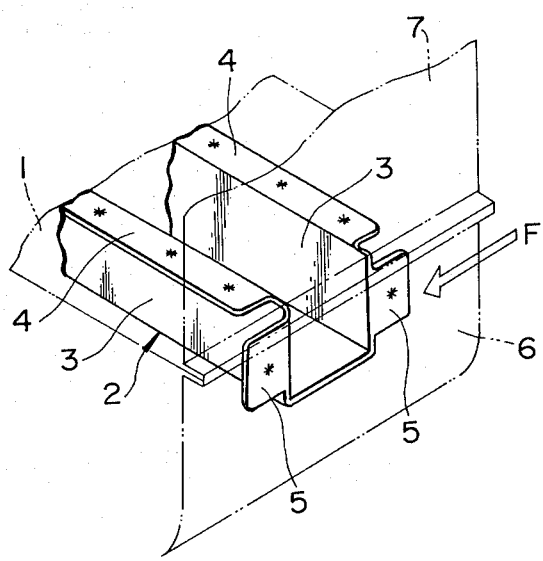
FIG. 2 is a perspective diagram showing a conventional elongated channel member subjected to shear forces transversely thereon.
Figure 3:
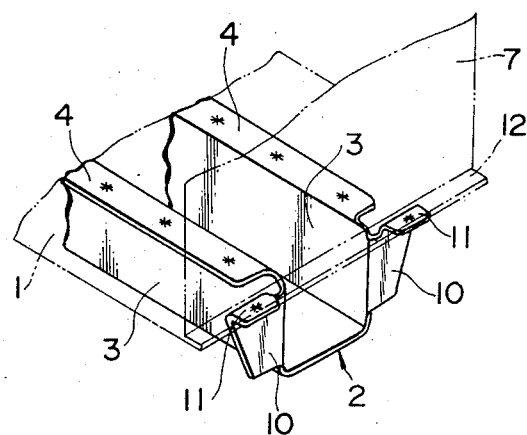
FIG. 3 is a view similar to FIG. 2 showing a first embodiment of a panel reinforcement structure construction according to the present invention.

Referring to a first embodiment illustrated in FIG. 3, an elongate channel member 2 is fixedly attached at an open section thereof to a vehicle structural panel, viz., a rear floor panel. The elongate channel member has flanges 4, 4 which are formed by bending side sections 3, 3 and are securely attached to the rear floor panel 1 by spot welding. Arms 10, 10, each formed by bending one side section 3, 3 of the elongate channel member 2, extend from the end of the elongate channel member transversely with respect to the longitudinal axis of the channel member 2. Attachment flanges 11, 11, each formed by bending one of the arms 10, 10, are also attached to the rear floor panel 1 by spot welding. The rear floor panel 1 is attached to a flange 12 of a rear upper panel 7 by spot welding.

Figure 4:
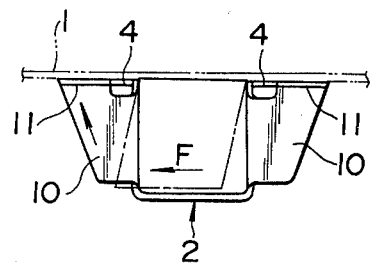
FIG. 4 is a view in the longitudinal direction of the channel member used in FIG. 3.

Since the arms 10, 10 extending from the rear ends of the channel member side sections 3, 3 are attached to the rear floor panel 1 at their attachment flanges 11, 11, the panel reinforcement structure construction reinforces the structural integrity and resists the effect of shear forces F acting transversely on the elongate channel member 2. The shear forces F are transmitted to the rear floor panel 1 through the flanges 4, 4 of the channel member 2 and the attachment flanges 11, 11 of the arms 10, 10. Under this force, the side sections 3, 3 of the elongate channel member 2 would otherwise tend to deform as shown by the one dot chain line in FIG. 4, but the arms 10, 10 maintain the cross-sectional shape of the elongate channel member 2 because the arm attachment flanges 11, 11 are fixedly attached to the rear floor panel 1.

Figure 5:
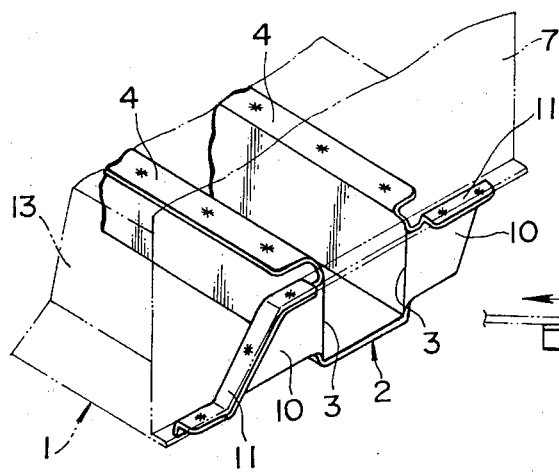
FIG. 5 is a view similar to FIG. 3 showing a second embodiment.

The second embodiment as illustrated in FIG. 5 is now explained.

This embodiment is different from the first embodiment in that a rear floor panel 1 has a shoulder 13 so as to increase its structural rigidity. The shoulder 13 is disposed on an outward side of and extends along the longitudinal axis of each elongate channel member 2. The attachment arm flange 11 has a shape conforming to the shoulder 13 of the rear floor panel 1 and is attached to the shoulder 13 by spot welding.

Thus, according to the panel reinforcement structure construction of this embodiment, the provision of the shoulder 13 further reduces the bending moment occurring in the rear floor panel 1 owing to the effect of the shear forces F.

Figure 6:
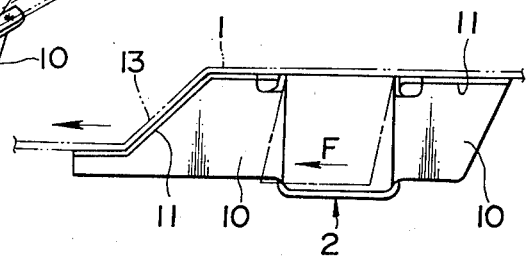
FIG. 6 is a view in a longitudinal direction of the channel member used in FIG. 5.

Under this force, the cross-sectional shape of the elongate channel member 2 is not deformed as shown by the one dot chain line in FIG. 6 but remains intact.

Although in this embodiment, the shoulder 13 is formed on only one side of the elongate channel member, two shoulders may be disposed on opposite sides of each elongate channel member 2. In this case the structural rigidity of the rear floor panel 1 is increased further.

As having been described, according to the panel reinforcement structure construction of this invention, arms extend from the rear ends of the channel member side sections and the arm attachment flanges are attached to the rear floor panel so as to reinforce the structural integrity of the vehicle structural panel and resist the effect of shear forces acting transversely on the elongate channel member.

What is claimed is:

1. A panel reinforcement structure construction for a vehicle comprising:

a vehicle structural panel;

an elongate channel member having two side sections and a bottom section, said side sections and said bottom section cooperating to define a channel, each of said side sections having a first attachment flange attached to and extending transversely from the upper free edge of said side section, said first attachment flange being fixed to said vehicle structural panel, said elongate channel member having two arm sections, each attached to and extending transversely from the end of each of said side sections, each of said arm sections having a second attachment flange attached to and extending transversely from the upper free edge of said arm section, said second attachment flange being fixed to said vehicle structural panel.

2. A panel reinforcement structure construction as claimed in claim 1, wherein the major dimension of each of said first attachment flanges is perpendicular to the major dimension of at least one of said second attachment flanges.

3. A panel reinforcement structure construction as claimed in claim 1 or 2, wherein said vehicle structural panel has a shoulder, the major dimension of which extends parallel to the major dimension of said side sections of said elongate channel member, one of said second attachment flanges being shaped to conform to said shoulder and being fixed to said shoulder.

* * * * *